United States Patent
Kang et al.

(10) Patent No.: US 11,431,906 B2
(45) Date of Patent: Aug. 30, 2022

(54) ELECTRONIC DEVICE INCLUDING TILT OIS AND METHOD FOR CAPTURING IMAGE AND PROCESSING CAPTURED IMAGE

(71) Applicant: Samsung Electronics Co., Ltd., Gyeonggi-do (KR)

(72) Inventors: Wonseok Kang, Gyeonggi-do (KR); Chanyoung Moon, Gyeonggi-do (KR); Wonseok Song, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/092,644

(22) Filed: Nov. 9, 2020

(65) Prior Publication Data

US 2021/0160429 A1 May 27, 2021

(30) Foreign Application Priority Data

Nov. 21, 2019 (KR) ........................ 10-2019-0150320

(51) Int. Cl.
*H04N 5/232* (2006.01)
*H04N 5/225* (2006.01)
*H04N 5/335* (2011.01)

(52) U.S. Cl.
CPC ..... *H04N 5/23287* (2013.01); *H04N 5/23258* (2013.01); *H04N 5/23293* (2013.01)

(58) Field of Classification Search
CPC ........... H04N 5/23287; H04N 5/23293; H04N 5/23258; H04N 5/23261; H04N 5/23299; H04N 5/23238; H04N 5/23245; H04N 5/23277; H04N 5/2259; H04N 5/33536; H04N 2201/04796

USPC ....... 348/208.2, 208.99, 208.1, 208.3, 208.4, 348/208.5, 208.7, 208.11, 208.12, 208.13, 348/222.1, 333.11, 326, 345
See application file for complete search history.

(56) References Cited

U.S. PATENT DOCUMENTS

| 11,184,549 | B2 * | 11/2021 | Yamaguchi | ........ H04N 5/23299 |
| 2006/0039693 | A1 | 2/2006 | Lee et al. | |
| 2011/0115927 | A1 | 5/2011 | Jang | |
| 2011/0216159 | A1 * | 9/2011 | Yoshizumi | ............. H04N 5/225 348/36 |
| 2012/0086824 | A1 * | 4/2012 | Asakura | ................. H04N 5/228 348/208.99 |

(Continued)

FOREIGN PATENT DOCUMENTS

| JP | 2011-215199 A | 10/2011 |
| JP | 2015-114484 A | 6/2015 |

(Continued)

OTHER PUBLICATIONS

International Search Report dated Feb. 22, 2021.

*Primary Examiner* — Marly S Camargo
(74) *Attorney, Agent, or Firm* — Cha & Reiter, LLC

(57) ABSTRACT

In certain embodiments, an electronic device comprises a camera; a tilt optical image stabilizer (OIS) configured to rotate the camera with respect to the electronic device, about at least one axis; and at least one processor operatively connected to the camera and the tilt OIS, wherein the at least one processor is configured to: operate the camera and the tilt OIS such that the camera is rotated about the at least one axis and captures an image, and synthesize a plurality of images captured by the camera.

14 Claims, 13 Drawing Sheets

(56) References Cited

U.S. PATENT DOCUMENTS

| | | | |
|---|---|---|---|
| 2012/0249866 A1* | 10/2012 | Alm | H04N 5/23299 |
| | | | 348/373 |
| 2013/0221226 A1* | 8/2013 | Koren | G01T 1/20 |
| | | | 250/366 |
| 2014/0362205 A1* | 12/2014 | Sasaki | G02B 21/36 |
| | | | 348/79 |
| 2016/0316120 A1 | 10/2016 | Gintsburg | |
| 2017/0155845 A1* | 6/2017 | Manabe | H04N 5/23277 |
| 2018/0041709 A1 | 2/2018 | Konttori et al. | |
| 2019/0018259 A1 | 1/2019 | Minamisawa et al. | |
| 2019/0391650 A1* | 12/2019 | Nakashima | G06F 3/016 |

FOREIGN PATENT DOCUMENTS

| | | | | |
|---|---|---|---|---|
| JP | 2015114484 | * | 6/2015 | G03B 5/00 |
| JP | 201920464 A | | 2/2019 | |
| KR | 10-2016-0087684 A | | 7/2016 | |
| KR | 20160087684 | * | 7/2016 | G03B 5/02 |

\* cited by examiner (a)

(b)

(c)

(a)

(b)

ELECTRONIC DEVICE INCLUDING TILT OIS AND METHOD FOR CAPTURING IMAGE AND PROCESSING CAPTURED IMAGE

CROSS-REFERENCE TO RELATED APPLICATION(S)

This application is based on and claims priority under 35 U.S.C. 119 to Korean Patent Application No. 10-2019-0150320, filed on Nov. 21, 2019, in the Korean Intellectual Property Office, the disclosures of which are herein incorporated by reference in their entireties.

BACKGROUND

Field

The disclosure relates to an electronic device including a tilt OIS and a method for capturing an image and processing the captured image.

Background

One problem that frequently occurs with taking photographs is the tendency of the user's hand to shake. When the user's hand shakes while taking a photograph, the photograph that is captured may be displaced from the desired photograph. In the case of video, when the video is replayed, there can be a displeasing change of vantage point that makes the video seem "wobbly".

The above information is presented as background information only to assist with an understanding of the disclosure. No determination has been made, and no assertion is made, as to whether any of the above might be applicable as prior art with regard to the disclosure.

SUMMARY

According to certain embodiments of the disclosure, an electronic device comprises a camera; a tilt optical image stabilizer (OIS) configured to rotate the camera with respect to the electronic device, about at least one axis; and at least one processor operatively connected to the camera and the tilt OIS, wherein the at least one processor is configured to: operate the camera and the tilt OIS such that the camera is rotated about the at least one axis and captures an image, and synthesize a plurality of images captured by the camera.

According to certain embodiments of the disclosure, a method of an electronic device including a camera and a tilt optical image stabilizer (OIS) for rotating the camera about at least one axis with respect to the electronic device comprises: operating the camera and the tilt OIS such that the camera is rotated about the at least one axis and captures an image; and synthesizing a plurality of images captured by the camera.

BRIEF DESCRIPTION OF THE DRAWINGS

The above and other aspects, features and advantages of certain embodiments of the disclosure will be more apparent from the following detailed description, taken in conjunction with the accompanying drawings.

DETAILED DESCRIPTION

Certain embodiments of the disclosure provide an electronic device including a tilt Optical Image Stabilizer System (OIS) capable of rotating a camera of the electronic device about at least one axis, and also provide a method for capturing an image by using the tilt OIS and processing the captured image.

In addition, certain embodiments of the disclosure are to provide an electronic device and method for automatically setting or selecting an optimal photographing mode depending on a photographing situation by detecting a user input and/or a state of the electronic device.

In addition, certain embodiments of the disclosure are to provide an electronic device and method for capturing a plurality of images having the same optical characteristics by operating a tilt OIS and processing the plurality of images to obtain an image with an expanded angle of view or an improved resolution.

Hereinafter, embodiments of the disclosure will be described in detail with reference to the accompanying drawings.

Figure 1:
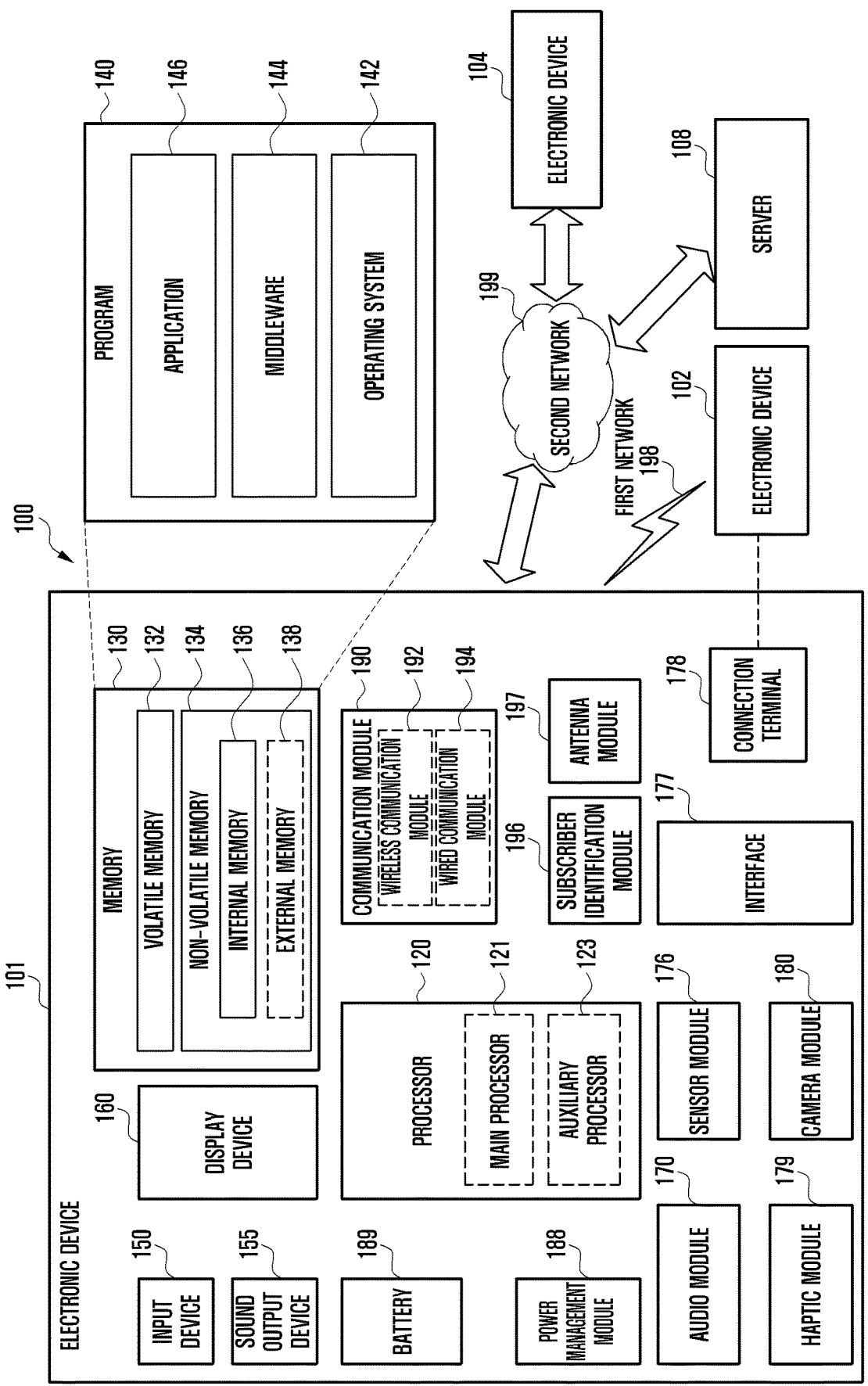
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera 180, a power management module 188, a battery 189, a communication module 190, a subscriber identification module (SIM) 196, or an antenna module 197. In some embodiments, at least one (e.g., the display device 160, haptic module 170) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The term "processor" shall be understood to include both the singular and plural contexts The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera 180 may capture a still image or moving images. According to an embodiment, the camera 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

In certain embodiments, the electronic device 101 can be a smartphone. The camera 180 is a popular feature of smartphones. Users can use the camera 180 to take both pictures and videos.

Figure 2:
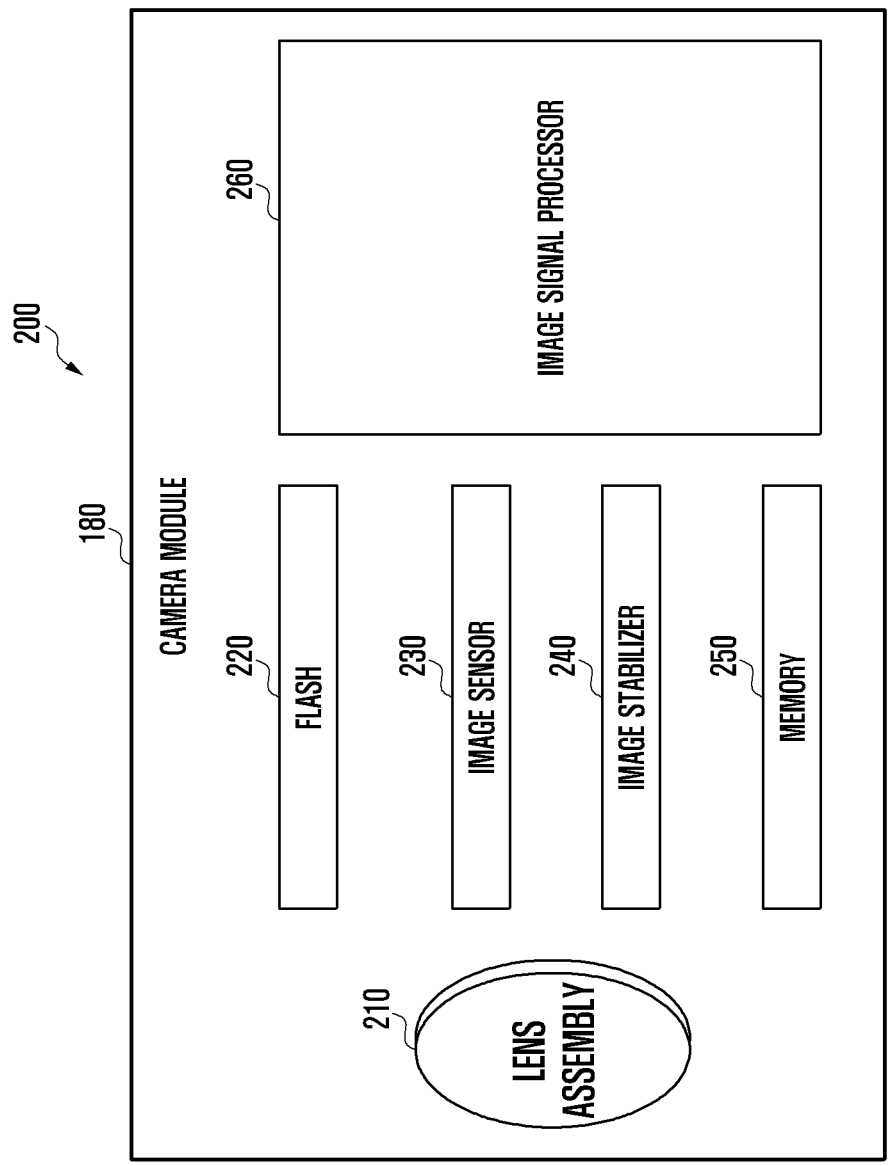
FIG. 2 is a block diagram illustrating a camera according to certain embodiments.

FIG. 2 is a block diagram 200 illustrating the camera 180 according to certain embodiments. Referring to FIG. 2, the camera 180 may include a lens assembly 210, a flash 220, an image sensor 230, an image stabilizer 240, memory 250 (e.g., buffer memory), or an image signal processor 260 and a housing. The lens assembly 210 may collect light emitted or reflected from an object whose image is to be taken. The lens assembly 210 may include one or more lenses. According to an embodiment, the camera 180 may include a plurality of lens assemblies 210. In such a case, the camera 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera 180 or the electronic device 101 including the camera 180. This allows compensating for at least part of a negative effect (e.g., image blurring) by the movement on an image being captured. According to an embodiment, the image stabilizer 240 may sense such a movement by the camera 180 or the electronic device 101 using a gyro sensor (not shown) or an acceleration sensor (not shown) disposed inside or outside the camera 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera 180. An image processed by the image signal processor 260 may be stored back in the memory 250 for further processing, or may be provided to an external component (e.g., the memory 130, the display device 160, the electronic device 102, the electronic device 104, or the server 108) outside the camera 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of cameras 180 having different attributes or functions. In such a case, at least one of the plurality of cameras 180 may form, for example, a wide-angle camera and at least another of the plurality of cameras 180 may form a telephoto camera. Similarly, at least one of the plurality of cameras 180 may form, for example, a front camera and at least another of the plurality of cameras 180 may form a rear camera.

It is noted that in certain embodiments, some of the above mentioned components can be omitted from the camera. For example, the camera 180 can include the lens assembly 210, the image sensor 230, and a housing that maintains the spatial relationship between the lens assembly 210 and the image sensor 230.

Figure 3A:
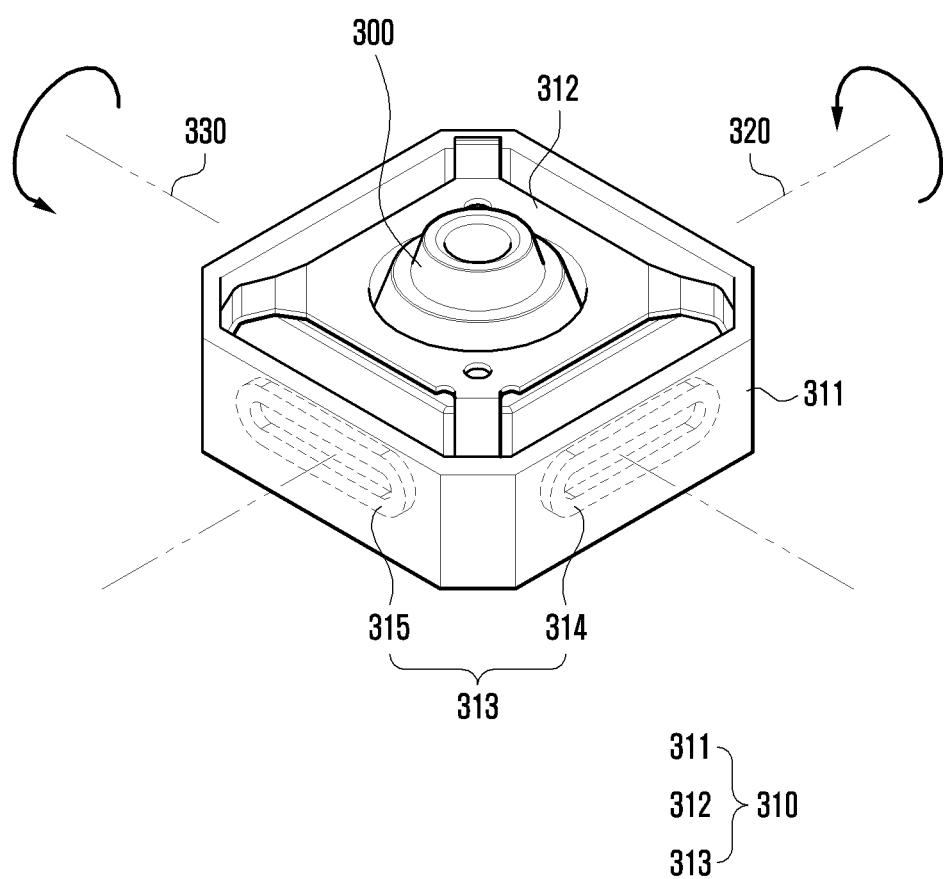
FIG. 3A is a perspective view illustrating a camera and a tilt OIS according to certain embodiments.

FIG. 3A is a perspective view illustrating a camera and a tilt OIS according to certain embodiments.

According to certain embodiments, a tilt OIS 310 is a component that rotates a camera 300 (e.g., the camera 180 in FIGS. 1 and 2) with respect to an electronic device, about at least one axis (e.g., the electronic device 101 in FIG. 1). The at least one axis may include a pitch axis, a yaw axis, and/or a roll axis. When the tilt OIS 310 rotates the camera 300, an angle formed by the central axis of the camera 300 with the electronic device may be changed. In certain embodiments, the camera 300 and tilt OIS 310 can be disposed in the structure of an electronic device. When taking a picture, the user's hand may not be steady, and as a result, causes the electronic device to shake. In certain embodiments, the tilt OIS 310 rotates the camera 300 with respect to the electronic device opposite the movement of the electronic device caused by the shaking of the user's hand. As a result, the camera 300 can maintain a still position with respect to the exterior of the electronic device.

Additionally, the tilt OIS 310 can also be used to expand the shooting range of the camera 300. Even when the electronic device is relatively still, the tilt OIS 310 can rotate the camera 300 to take adjacent/overlapping images that can be synthesized to create a single image.

Referring to FIG. 3A, the tilt OIS 310 may include a holder 311, a fastener 312, and a driver 313. The tilt OIS 310 shown in FIG. 3A is exemplary only and may be implemented alternatively by omitting or changing at least one of the above parts of the tilt OIS 310. As mentioned above, the tilt OIS 310 may rotate the camera 300 about at least one axis. Specifically, the camera 300 is fastened by the fastener 312 and may be rotated with respect to the holder 311 by the operation of the driver 313 of the tilt OIS 310.

According to certain embodiments, the holder 311 of the tilt OIS 310 may be installed to be fixed to a housing and/or frame of the electronic device. The holder 311 may be formed in a shape capable of accommodating the camera 300 therein.

The fastener 312 of the tilt OIS 310 may be formed of a flexible material to support a rotation of the camera 300. According to certain embodiments, the fastener 312 may be disposed to at least partially cover the camera 300 and may be connected to the holder 311 at least in part, to prevent egress of the camera 300 from the holder 311. When the tilt OIS 310 rotates the camera 300, the fastener 312 may adjust the rotation speed or angle of the camera 300 to an appropriate level.

The driver 313 of the tilt OIS 310 may be configured to generate a driving force for rotating the camera 300 about at least one rotation axis. For example, the driver 313 may rotate the camera 300 by using an electromagnetic force as a driving force. The driver 313 may be composed of a pair of components, which is installed on the camera 300 and the holder 311, respectively. For example, the driver 313 may be configured with a coil installed on the camera 300 and a magnet installed on the holder 311. In this case, the camera 300 may be rotated with respect to the holder 311 by the electromagnetic force between the coil and the magnet. The driver 313 may be modified to any other structure capable of rotating the camera 300 with respect to the holder 311. Referring to FIG. 3A, the driver 313 may include a first driving member 314 and a second driving member 315. The first driving member 314 may be disposed at a position to rotate the camera 300 about the first axis 320, and the second driving member 315 may be disposed at a position to rotate the camera 300 about the second axis 330.

Figure 3B:
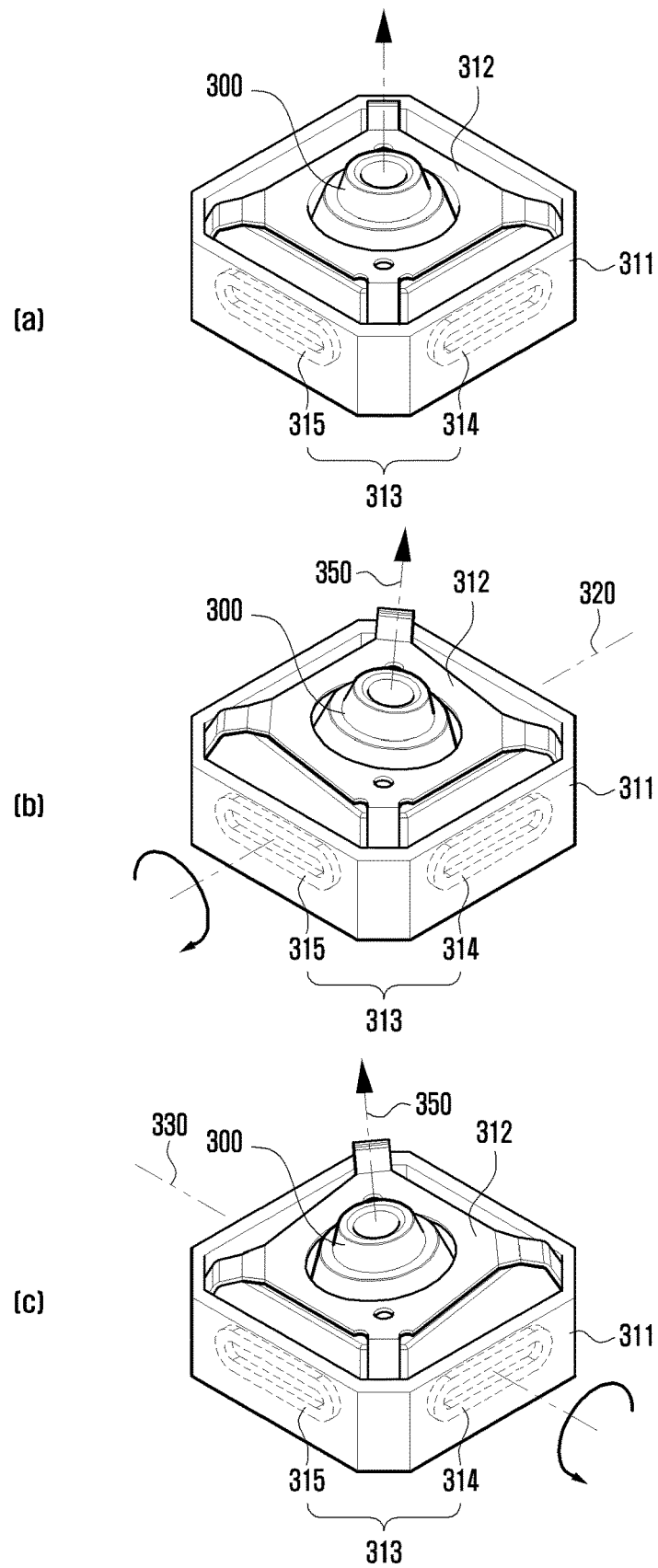
FIGS. 3B and 3C are views illustrating a process of operating the camera and the tilt OIS shown in FIG. 3A.
Figure 3C:
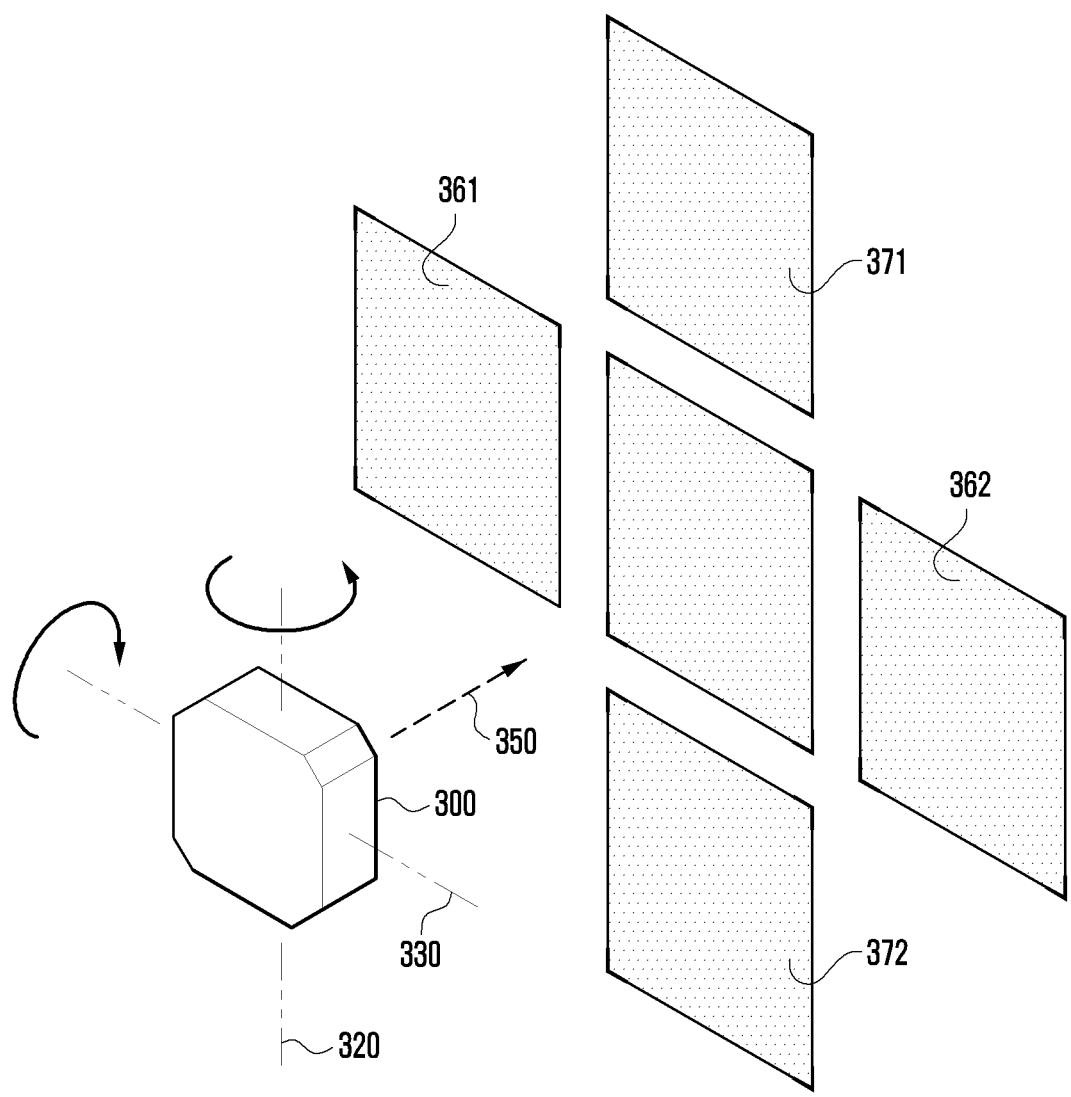

FIGS. 3B and 3C are views illustrating a process of operating the camera and the tilt OIS shown in FIG. 3A.

Referring to FIG. 3B, the tilt OIS 310 may rotate the camera 300 about at least one axis 320 and 330. The rotation of the camera 300 may change the direction of an optical axis 350 of the camera 300. The optical axis 350 can be a straight line connecting the centers of lenses and/or mirrors (e.g., the lens assembly 210 in FIG. 2) inside the camera 300. Because the tilt OIS 310 rotates the camera 300 itself with respect to the electronic device and the holder 311 of the tilt OIS 310, only the direction of the optical axis 350 may be changed by the rotation of the camera 300. Even when the tilt OIS 310 is driven, optical characteristics such as a focal length of the camera 300 and a positional relationship between a lens and an image sensor in the camera 300 do not change. Thus, even though the tilt OIS 310 rotates the camera 300, side effects such as wobbling due to a change in optical characteristics can be avoided.

The tilt OIS 310 may rotate the camera 300 about two axes 320 and 330. The first axis 320 may be a yaw axis, and the second axis 330 may be a pitch axis. The tilt OIS 310 may rotate the camera 300 in a direction that cancels a motion generated by a user during an image capturing process through the camera 300. Therefore, the tilt OIS 310 may improve the quality of an image acquired through the camera 300. Specifically, for example, the tilt OIS 310 may allow a shutter speed to be sufficiently ensured so that a brighter image can be captured in a low exposure situation. In addition, the tilt OIS 310 may offset a shake caused by a user during a video recording process so that an image with a reduced shake can be captured.

A processor (e.g., the processor 120 in FIG. 1) of the electronic device may acquire motion information of the electronic device from a sensor module (e.g., the sensor module 176 in FIG. 1), such as a gyroscope or accelerometer of the electronic device. Based on the motion information, the processor may operate the tilt OIS 310. For example, if recognizing or predicting, from the motion information, that the optical axis 350 of the camera 300 moves by a certain angle in a specific direction with respect to a reference direction (e.g., a direction indicating a focused point), the processor may operate the tilt OIS 310 to rotate the camera 300 by that angle in a direction opposite to the specific direction.

In certain embodiments, the tilt OIS 310 can also be used to capture images from a wider range than permitted by the camera 300. For example, the OIS 310 can be used to change the optical axis of the camera 300 to capture multiple adjacent/overlapping images, which can then be synthesized to create a single image. In the foregoing case, the electronic device 101 remains relatively stationary, and the camera 300 is rotated.

As shown in FIG. 3C, when the tilt OIS 310 is operated, a shooting range of the camera 300 may be changed. The shooting range may be determined by the direction of the optical axis 350 and the angle of view. That is, because the direction of the optical axis 350 of the camera 300 may be changed by the operation of the tilt OIS 310, the shooting range may be changed accordingly.

The shooting range may be changed within a rotation radius of the camera 300 by the tilt OIS 310. For example, when the tilt OIS 310 is operated to rotate the camera 300 about the first axis 320, the shooting range may be changed between limits indicated by reference numerals 361 and 362 of FIG. 3C. Similarly, when the tilt OIS 310 is operated to rotate the camera 300 about the second axis 330, the shooting range may be changed between limits indicated by reference numerals 371 and 372 of FIG. 3C. As such, the tilt OIS 310 may variously change the shooting range by rotating the camera 300 even when the electronic device is fixed.

According to certain embodiments, the camera 300 and the tilt OIS 310 may be operated in real time. When the user executes a camera application, a preview or live-view may be displayed on a display (e.g., the display device 160 in FIG. 1). The preview or live-view may refer to the shooting range currently being captured. When images are acquired from various shooting ranges during real-time operations of the camera 300 and the tilt OIS 310, the processor (e.g., the processor 120 in FIG. 1 or the image signal processor 260 in FIG. 2) may synthesize the acquired images in real time. Therefore, the preview or live-view may be displayed with the angle of view which is wider than the angle of view that the camera 300 can represent.

In this disclosure, the processor may mean the processor 120 shown in FIG. 1 or the image signal processor 260 shown in FIG. 2. Controlling the operation of the tilt OIS 310 may be performed by the processor (e.g., the processor 120 in FIG. 1) of the electronic device (e.g., the electronic device 101 in FIG. 1). Image processing for synthesizing a plurality of captured images may be performed by the image signal processor 260 in FIG. 2. In some cases, image processing for synthesizing a plurality of captured images may be performed by the processor 120 in FIG. 1.

Figure 4:
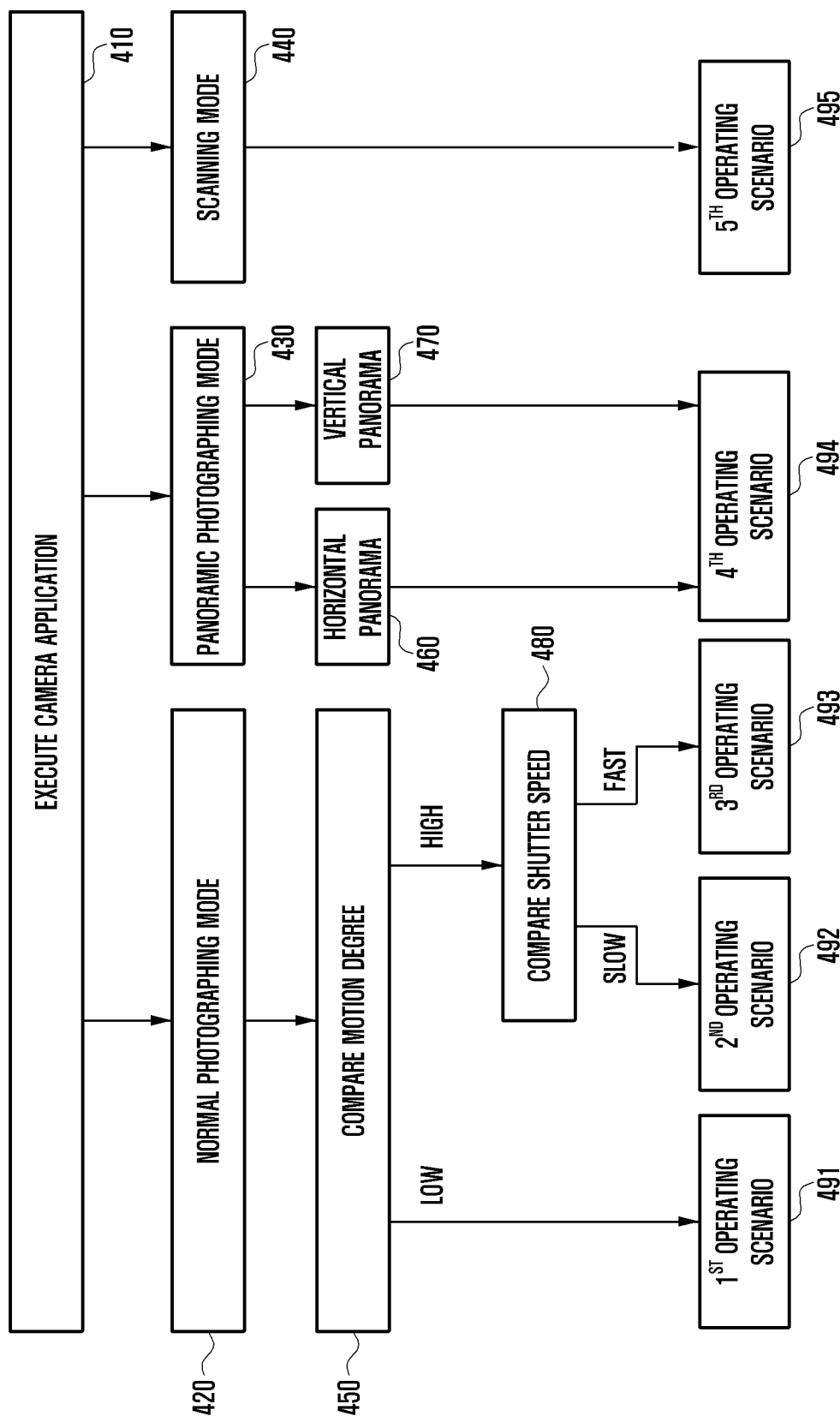
FIG. 4 is a flow diagram illustrating a process of determining an mode of a camera and a tilt OIS according to certain embodiments.

FIG. 4 is a flow diagram illustrating a process of determining an mode of a camera and a tilt OIS according to certain embodiments.

According to certain embodiments, a method for capturing an image and processing the captured image may be performed based on a particular mode selected from among a plurality of modes (which can include operating scenarios) depending on various conditions.

When a camera-related application is executed, the user may select one of various photographing modes including a normal photographing mode 420, a panoramic photographing mode 430, and a scanning mode 440. Upon receiving a user's selection input, a processor (e.g., the processor 120 in FIG. 1) of an electronic device (e.g., the electronic device 101 in FIG. 1) may perform one of various modes suitable for the selected photographing mode.

First, a case where an input of selecting the normal photographing mode 420 is received will be now described. When the normal photographing mode 420 is selected, the processor of the electronic device may receive motion information of the electronic device through a sensor module (e.g., the sensor module 176 in FIG. 1) of the electronic device.

According to certain embodiments, based on the motion information, the processor may compare a motion degree of the electronic device with a predetermined value at step 450. If the motion degree of the electronic device is lower than the predetermined value, the processor may determine that the electronic device is in a state fixed by a fixing tool such as a tripod. In this case, the processor may control the camera (e.g., the camera 300 in FIG. 3A) and the tilt OIS (e.g., the tilt OIS 310 in FIG. 3A) under a first mode (mode 491).

If the motion degree of the electronic device is higher than the predetermined value, the processor may determine that the electronic device is in a state held by the user. Then, the processor may receive information about a shutter speed corresponding to an appropriate exposure determined by the camera, and compare the received shutter speed with a predetermined value at step 480. When the shutter speed is slower than the predetermined value, the processor may control the camera and the tilt OIS under a second mode 492.

If the shutter speed is faster than the predetermined value, the processor may control the camera and the tilt OIS under a third mode 493.

Alternatively, the second mode 492 and the third mode 493 may be determined according to a user's selection. In this case, the user may select a desired scenario regardless of the shutter speed. Upon receiving a user's selection input, the processor may determine one of the second and third modes 492 and 493.

Next, a case where an input of selecting the panoramic photographing mode 430 is received will be now described. When the panoramic photographing mode 430 is selected, the user may select a horizontal panorama 460 or a vertical panorama 470. The processor may receive an input of selecting the horizontal panorama 460 or the vertical panorama 470. In this case, the processor may control the camera and the tilt OIS under a fourth mode 494.

Next, a case where an input of selecting the scanning mode 440 is received will be now described. When the scanning mode 440 is selected, the processor may control the camera and the tilt OIS under a fifth mode 495.

The above-described modes 491 to 495 are by way of example, only, and other modes for the camera and the tilt OIS may be determined based on various kinds of information received through a user input and/or a sensor.

Hereinafter, the operations of the camera and the tilt OIS under the selected mode will be described in detail.

Figure 5A:
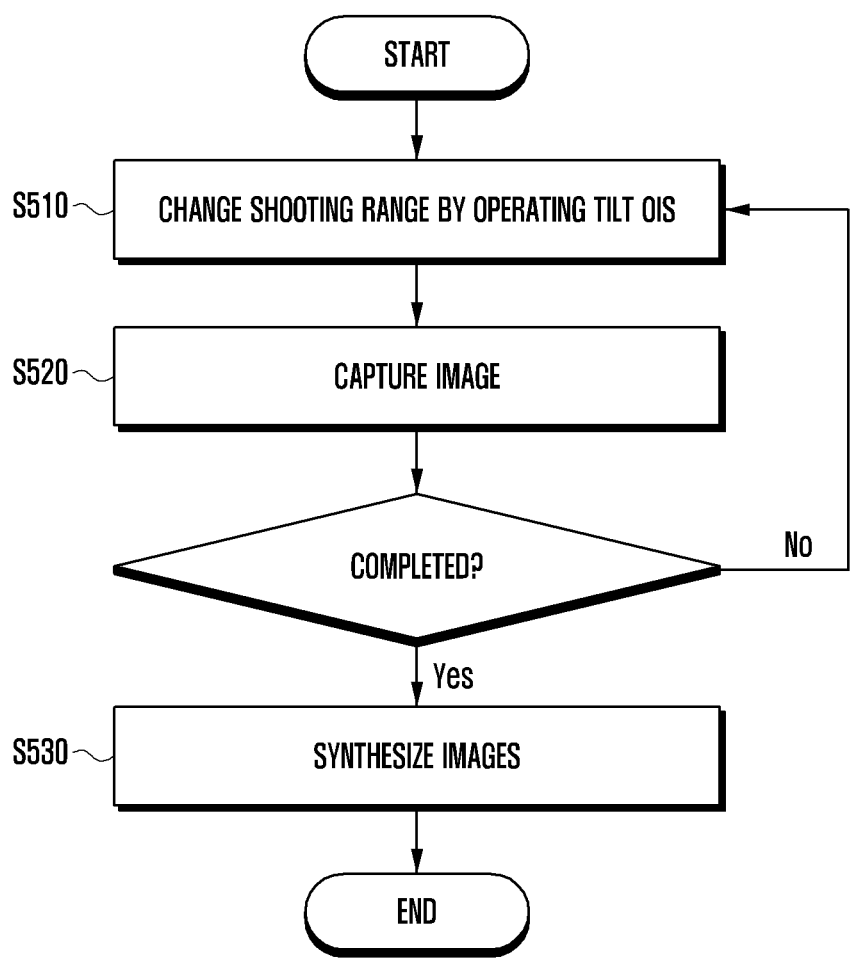
FIG. 5A is a flow diagram illustrating a first mode according to certain embodiments.
Figure 5B:
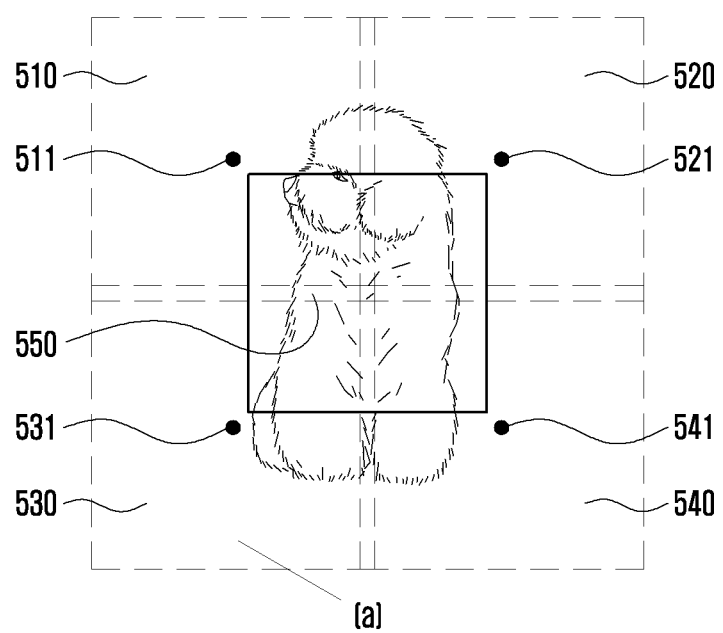
FIG. 5B is an exemplary diagram illustrating the first mode shown in FIG. 5A.
Figure 5B:
Figure 5B:
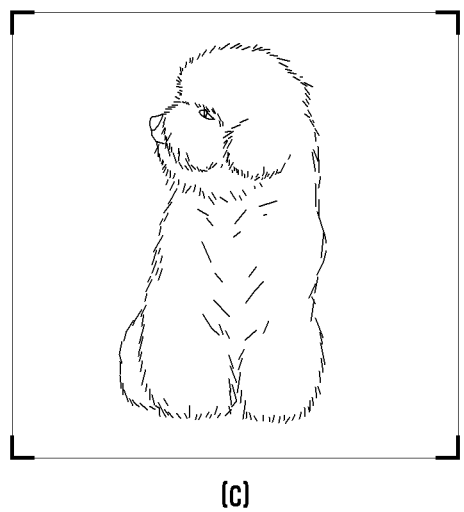

FIG. 5A is a flow diagram illustrating a first mode according to certain embodiments, and FIG. 5B is an exemplary diagram illustrating the first mode shown in FIG. 5A.

The first mode may refer to an mode selected when a normal photographing mode (e.g., the normal photographing mode 420 in FIG. 4) is selected and a motion degree indicated in motion information received through a sensor module (e.g., the sensor module 176 in FIG. 1) of an electronic device (e.g., the electronic device 101 in FIG. 1) is smaller than a predetermined value. That is, the first mode may be selected in a state where there is no or very little movement of the electronic device itself. For example, when the electronic device is in a state fixed by a fixing tool such as a tripod or supported by a fixed object, operations under the first mode may be determined.

In the first mode, the processor (e.g., the processor 120 in FIG. 1) may control the camera (e.g., the camera 300 in FIG. 3A) and the tilt OIS (e.g., the tilt OIS 310 in FIG. 3A) in order to acquire a synthesized image having an angle of view wider than that of a lens (e.g., the lens assembly 210 in FIG. 2) included in the camera. That is, the processor may acquire a plurality of captured images having different shooting ranges and stitch overlapped portions of the plurality of captured images, thereby obtaining a resultant image having a wider angle of view.

For example, as shown in FIG. 5B, four images having different shooting ranges may be captured. The processor may control the tilt OIS such that the optical axis of the camera passes through a center 511 of a first shooting range 510. That is, at step S510, the processor may change a shooting range through a change of the direction of the optical axis by operating the tilt OIS even when the electronic device is relatively fixed. When the optical axis of the camera passes through the center 511 of the first shooting range 510, the processor may control the camera to capture an image at step S520. Next, at the step S510, the processor may control again the tilt OIS such that the optical axis of the camera passes through a center 521 of a second shooting range 520. When the optical axis of the camera passes through the center 521 of the second shooting range 520, the processor may control the camera to capture an image at the step S520. In this way, the processor may control the camera to capture images in third and fourth shooting ranges 530 and 540, respectively.

According to certain embodiments, in each of the shooting ranges 510, 520, 530, and 540, the processor may control the camera to capture a plurality of images. In this case, the camera may perform a bracketing shooting having different exposure values in each of the respective shooting ranges 510, 520, 530, and 540. For example, the camera may perform three shootings in which the exposure value differs by 1 stop, thereby acquiring an image captured with an appropriate exposure value, an image captured with a lower exposure value by 1 stop, and an image captured with a higher exposure value by 1 stop. Three bracketing shootings are exemplary only, and the number of bracketing shootings may be varied as needed. Using such images captured with different exposure values, an image with an improved dynamic range may be obtained in the image synthesis process described below.

When all the shootings are completed in the first to fourth shooting ranges 510, 520, 530, and 540, the processor (e.g., the processor 120 in FIG. 1 or the image signal processor 260 in FIG. 2) may create a single image by synthesizing a plurality of captured images. For example, the processor may find overlapped portions 550 of the plurality of captured images through image analysis and stitch the overlapped portions 550 to synthesize the plurality of captured images. According to certain embodiments, the processor may correct an image distortion by using a result of the image analysis on the overlapped portions 550 of different images. For example, the processor may calculate average data of image outlines contained in the overlapped portions 550 and correct the image distortion by using the average data. Correcting the shape of each image, based on this correction value, may reduce the distortion of the synthesized image. In addition, using images obtained by the above-described bracketing shootings in the image synthesis process may improve the dynamic range of the synthesized image.

As such, when a plurality of images captured in different shooting ranges are synthesized into one image, an image having an angle of view wider than that of the lens of the camera can be easily obtained. In FIG. 5B, (b) shows a single image typically captured by the camera, and (c) shows a resultant image obtained by synthesizing a plurality of images captured using the tilt OIS. Comparing (b) and (c) of FIG. 5B, it can be seen that the resultant image obtained by synthesizing the captured images has a wider angle of view.

Although it has been described that a plurality of images are captured in four shooting ranges 510, 520, 530, and 540, the number of shooting ranges and the number of captured images may be variously changed. For example, it is possible to capture a plurality of images in nine shooting ranges and synthesize them into one image.

The second mode may refer to a mode selected when a normal photographing mode (e.g., the normal photographing mode 420 in FIG. 4) is selected, when a motion degree indicated in motion information received through a sensor module (e.g., the sensor module 176 in FIG. 1) of an electronic device (e.g., the electronic device 101 in FIG. 1) is greater than a predetermined value, and when a shutter speed according to an appropriate exposure is slower than a given value. That is, the second mode may be selected in a state where the movement of the electronic device itself is larger than in the above-described first mode. For example, when the user holds the electronic device, and when a shutter speed according to an appropriate exposure is slower than a given value in a low-illumination situation, operations under the second mode may be determined.

In the second mode, the processor (e.g., the processor 120 in FIG. 1) may operate the tilt OIS (e.g., the tilt OIS 310 in FIG. 3A) in order to minimize shaking by the user. Specifically, using the motion information received from the sensor module, the processor may operate the tilt OIS in a direction that compensates for the corresponding motion during the shooting of the camera (e.g., the camera 300 in FIG. 3A). Because the tilt OIS rotates the camera with respect to the electronic device, the optical characteristics of the camera may not change even when the camera is rotated. Therefore, it is possible to prevent various side effects that may occur due to changes in optical characteristics during the OIS correction process.

In the second mode, a shake-free image can be obtained even at a relatively slow shutter speed. In particular, the tilt OIS operation under the second mode makes it possible to obtain a clearer image even in a low-illumination situation.

Figure 6:
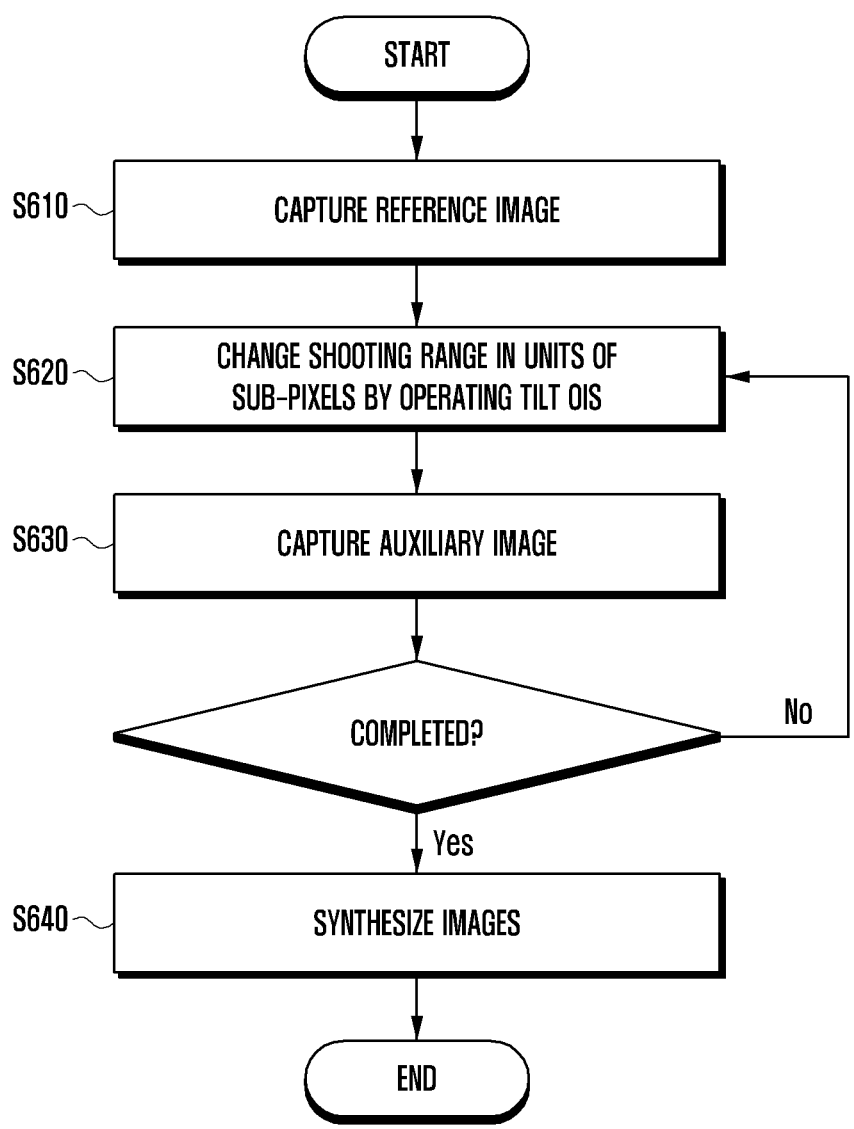
FIG. 6 is a flow diagram illustrating a third mode according to certain embodiments.

FIG. 6 is a flow diagram illustrating a third mode according to certain embodiments.

The third mode may refer to an mode selected when a normal photographing mode (e.g., the normal photographing mode 420 in FIG. 4) is selected, when a motion degree indicated in motion information received through a sensor module (e.g., the sensor module 176 in FIG. 1) of an electronic device (e.g., the electronic device 101 in FIG. 1) is greater than a predetermined value, and when a shutter speed according to an appropriate exposure is faster than a given value. That is, the third mode may be selected in a state where the movement of the electronic device itself is larger than in the above-described first mode. For example, when the user holds the electronic device, and when a shutter speed according to an appropriate exposure is faster than a given value in a relatively high-illumination situation, operations under the third mode may be determined.

If the shutter speed is sufficiently secured, a shake-free image can be obtained without the aid of a stabilizer. This is because the shutter speed is fast enough that even if the user's hand is shaking, there will be insufficient motion during the exposure time. Accordingly, in the third mode, the tilt OIS (e.g., the tilt OIS 310 in FIG. 3A) may be operated to obtain a high-quality image.

In certain embodiments, the processor can determine an amount of motion, and an exposure time. Based on the amount of motion with the exposure time/shutter speed, the processor can determine whether or not to use the tilt OIS 310. In certain embodiments, the processor can calculate a speed of motion and determine a distance that the camera will move during the exposure time. If the distance exceeds a predetermined threshold, the processor can use the tilt OIS 310, while if the distance does not exceed the predetermined threshold, the processor can determine not to use the tilt OIS 310.

The image sensor of the camera (e.g., the camera 300 in FIG. 3A) may be configured in units of a plurality of pixels. Also, each pixel may include at least one sub-pixel. In general, pixel shift refers to a technique to capture a plurality of images by adjusting a shooting range in units of sub-pixels and then synthesize the captured images to obtain a high-resolution image. Adjusting the shooting range in units of sub-pixels allows each pixel to contain much more color information. It is therefore possible to obtain a higher quality image compared to a case of capturing a single image.

The processor may control the camera to capture a reference image at step S610, operate the tilt OIS to change a shooting range in units of sub-pixels at step S620, and control the camera to capture a plurality of auxiliary images at step S630. Then, the processor may synthesize the reference image and the plurality of auxiliary images at step S640, thereby obtaining an image with improved quality. As described above, operating the tilt OIS may change the direction of the optical axis and thereby variously change the shooting range. In order to use the pixel shift technique, it is necessary to precisely change the shooting range in units of sub-pixels. The tilt OIS according to certain embodiments is capable of precisely changing the shooting range in units of sub-pixels, so that a plurality of images to which a pixel shift is applicable can be captured.

The tilt OIS according to certain embodiments can guarantee any movement of several tens of pixels or more. In addition, the tilt OIS does not change the optical characteristics of the camera even if the camera is rotated to change the shooting range, so that it is simple to acquire a plurality of images in which only the shooting range is changed under uniform conditions. For this reason, there is an advantage of remarkably reducing the possibility of errors caused by differences in the optical characteristics in the process of synthesizing a plurality of images.

Figure 7A:
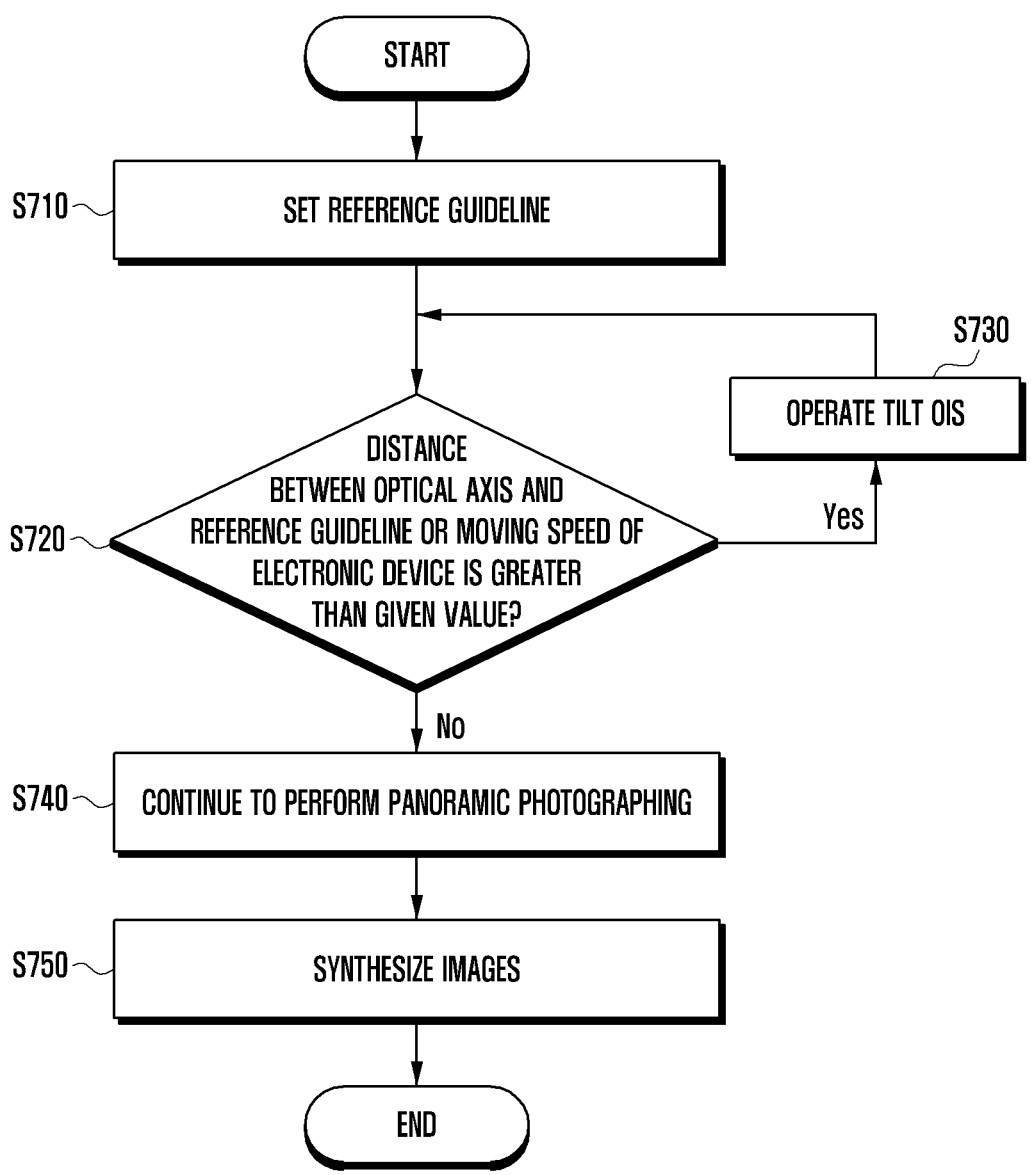
FIG. 7A is a flow diagram illustrating a fourth mode according to certain embodiments.
Figure 7B:
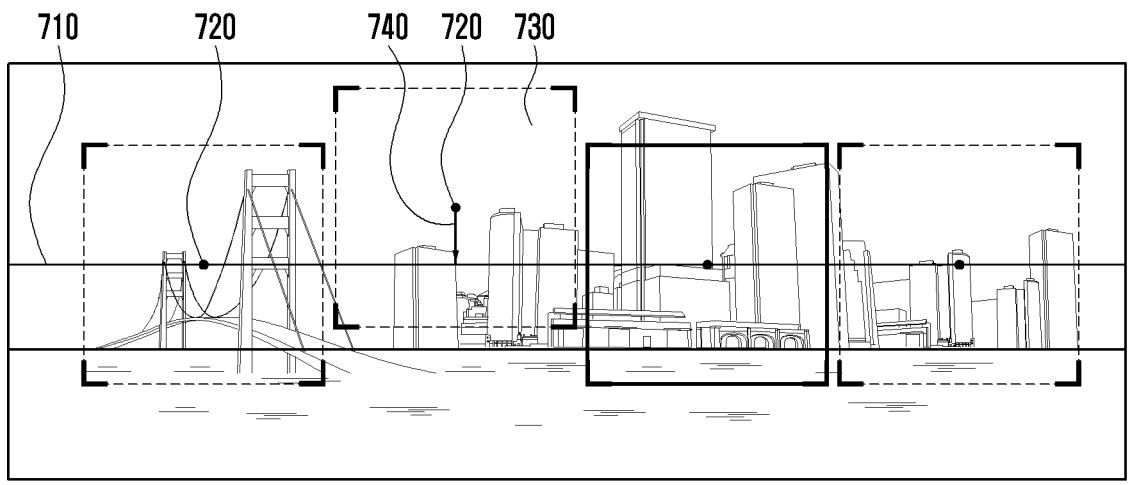
FIG. 7B is an exemplary diagram illustrating the fourth mode shown in FIG. 7A.
Figure 7B:
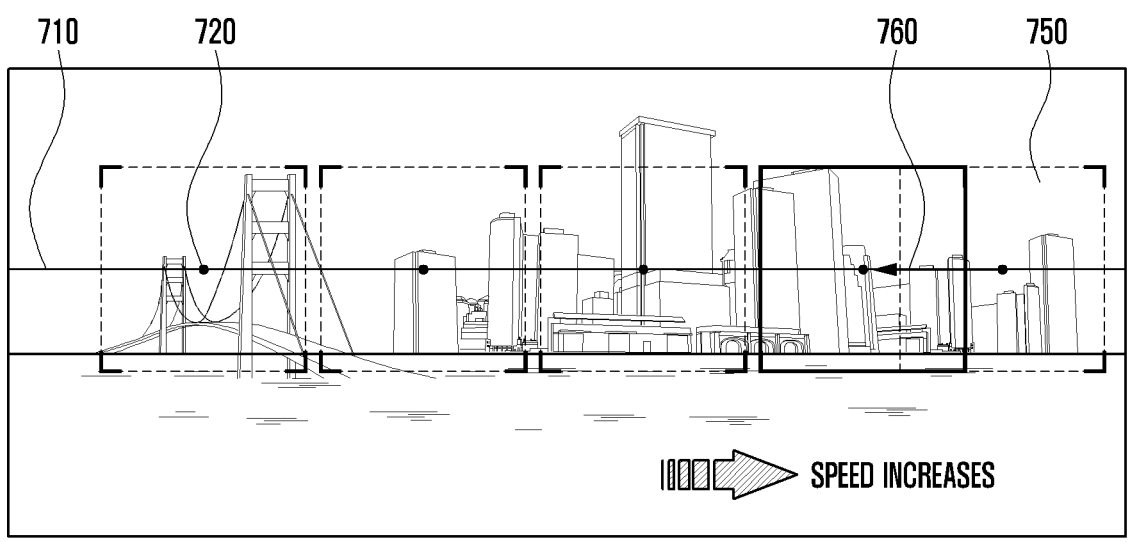

FIG. 7A is a flow diagram illustrating a fourth mode according to certain embodiments, and FIG. 7B is an exemplary diagram illustrating the fourth mode shown in FIG. 7A.

The fourth mode may refer to an mode selected when a panoramic photographing mode (e.g., the panoramic photographing mode 430 in FIG. 4) is selected.

In case that the panoramic photographing mode is selected, a processor (e.g., the processor 120 in FIG. 1) may receive a user's input of selecting a horizontal panorama or a vertical panorama. As shown in FIG. 7B, the horizontal panorama refers to panoramic photographing performed by an electronic device that is moving in a direction horizontal to the ground. In addition, although not shown, the vertical panorama refers to panoramic photographing performed by an electronic device that is moving in a direction perpendicular to the ground. At step S710, the processor may set a reference guideline 710 based on a shooting start point. The reference guideline 710 may be displayed in the form of a virtual straight line on a display (e.g., the display device 160 in FIG. 1) of the electronic device. In case of the horizontal panorama, the reference guideline 710 may be parallel to the ground. In case of the vertical panorama, the reference guideline may be perpendicular to the ground.

In order to perform a preferred panorama photographing, the electronic device needs to move at a constant speed while the optical axis of the camera coincides with the reference guideline 710. In the fourth mode, the processor may control the camera (e.g., the camera 300 in FIG. 3A) and the tilt OIS (e.g., the tilt OIS 310 in FIG. 3A) so as to disallow the optical axis of the camera to be deviated from the reference guideline 710 and also so as to compensate for a moving speed of the electronic device. Thus, in the case of a horizontal panorama photographing, the tilt OIS 310 can compensate for vertical movement, while disregarding horizontal movement. In certain embodiments, the processor can use the tilt OIS 310 to compensate for vertical movement, and compensate for speed variation in the horizontal motion to achieve a uniform rate of movement.

As shown in (a) of FIG. 7B, while horizontal panorama photographing is being performed, the processor may identify a distance between the optical axis 720 of the camera and the reference guideline 710. For example, as in a scene 730 of FIG. 7B, the optical axis 720 may be positioned above the reference guideline 710 (i.e., in the Y-axis direction of FIG. 7B), and thereby a distance difference may occur between the optical axis 720 and the reference guideline 710 (step S720). In this case, the processor may rotate the camera in a direction 740 that cancels such a distance difference between the optical axis 720 and the reference guideline 710 by operating the tilt OIS (step S730). For example, in case of the scene 730 of FIG. 7B, the tilt OIS may rotate the camera about a rotation axis parallel to the X axis of FIG. 7B. According to certain embodiments, the processor may operate the tilt OIS, based on motion information received through a sensor module (e.g., the sensor module 176 in FIG. 1) of the electronic device. The processor may continuously operate the tilt OIS during the panoramic photographing such that the distance between the optical axis 720 and the reference guideline 710 is maintained below a given value.

According to certain embodiments, the processor may operate the tilt OIS such that the moving speed of the electronic device is maintained below a given value. For example, when panoramic photographing is performed from left to right as shown in (b) of FIG. 7B, the moving speed of the electronic device may deviate from a given value (step S720). When the moving speed of the electronic device exceeds the given value as in a scene 750, the processor may move the optical axis 720 in a direction 760 by operating the tilt OIS to rotate the camera about a rotation axis parallel to the Y axis (step S730). In addition, when the moving speed of the electronic device falls below the given value, the processor may operate the tilt OIS to rotate the camera in the moving direction of the electronic device. Through this operation, it is possible to compensate for a change in the moving speed of the electronic device.

As such, the processor may continuously check whether the distance between the optical axis 720 and the reference guideline 710 or the moving speed of the electronic device remains within a given value, and continue to perform panoramic photographing (step S740). When the panoramic photographing is completed, the processor may synthesize captured images (step S750). According to certain embodiments, the electronic device may control the tilt OIS such that the optical axis 720 of the camera proceeds at a constant speed along the reference guideline 710 during the panoramic photographing. It is therefore possible to obtain a high quality panoramic image.

According to certain embodiments, the processor may control the tilt OIS such that the camera is rotated in a traveling direction of the electronic device at the point where the panoramic photographing ends. This may increase a panoramic photographing range.

Figure 8A:
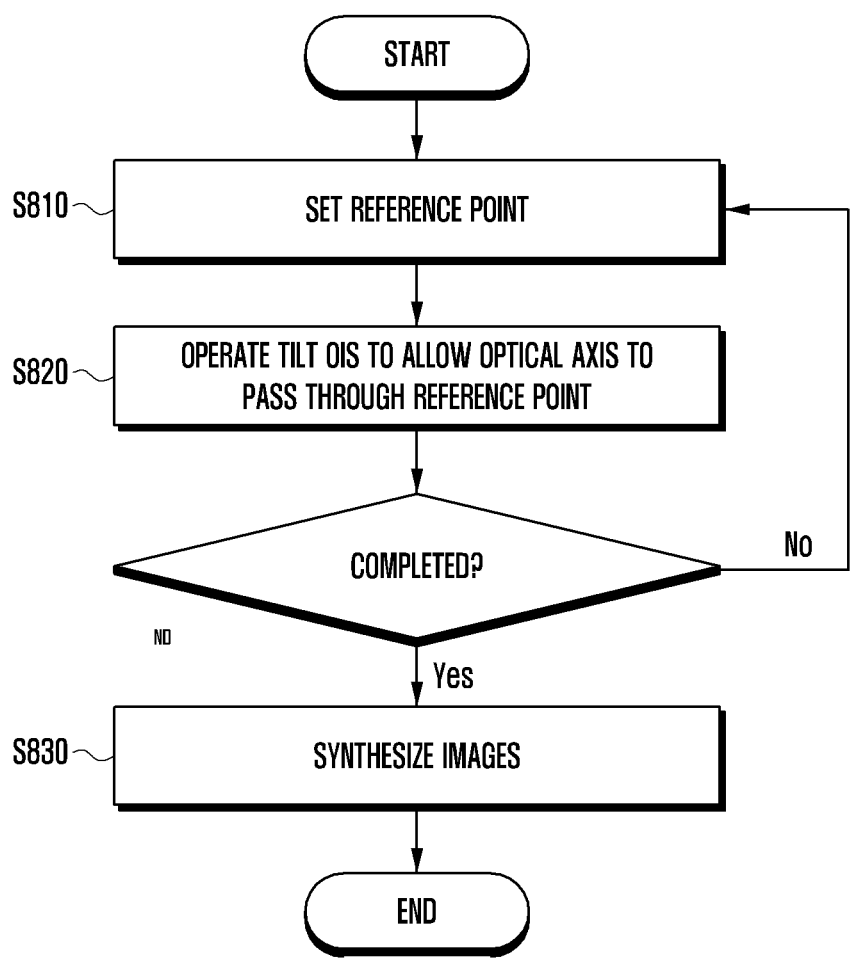
FIG. 8A is a flow diagram illustrating a fifth mode according to certain embodiments.
Figure 8B:
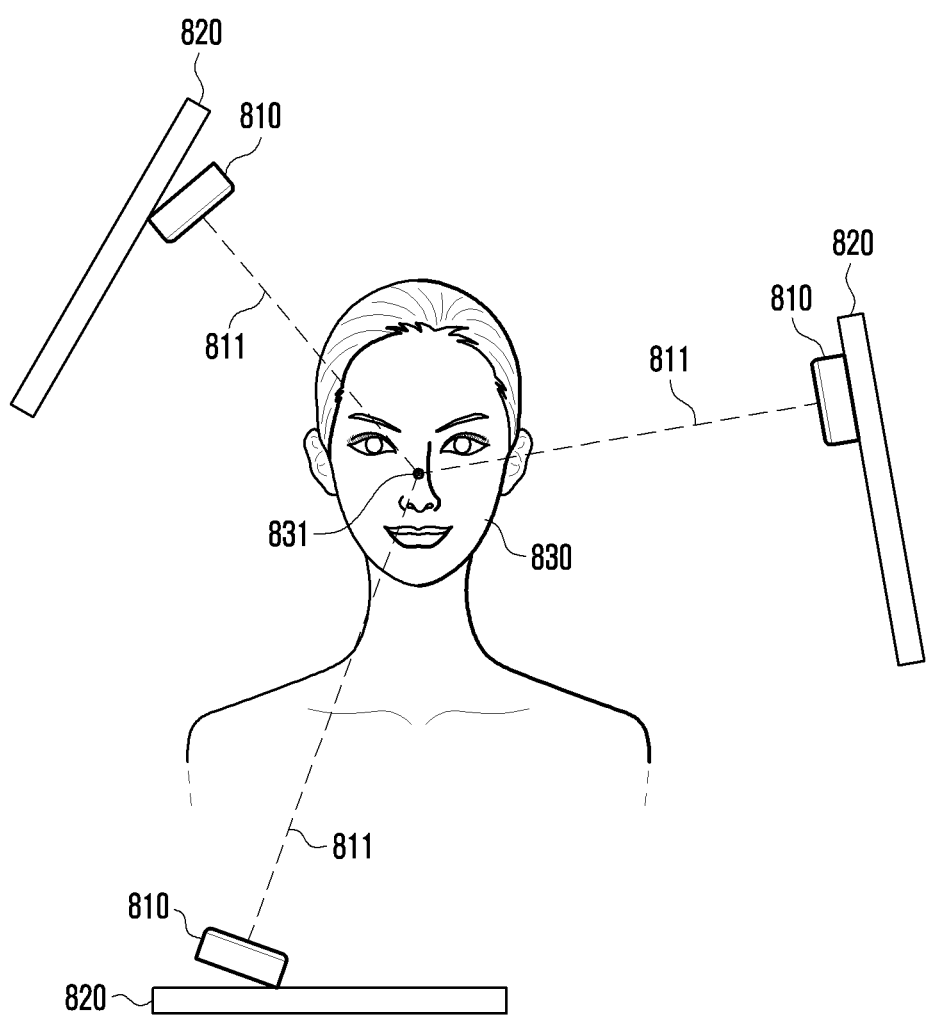
FIG. 8B is an exemplary diagram illustrating the fifth mode shown in FIG. 8A.

FIG. 8A is a flow diagram illustrating a fifth mode according to certain embodiments, and FIG. 8B is an exemplary diagram illustrating the fifth mode shown in FIG. 8A. In FIG. 8B, the connection and angle between an electronic device 820 and a camera 810 are exaggerated for description.

The fifth mode may refer to an mode selected when a scanning mode (e.g., the scanning mode 440 in FIG. 4) is selected.

The scanning mode may be a photographing mode that continuously photographs a subject and thereby generates a 3D image. In continuous shooting for 3D scanning, it may be important to obtain as much as possible a plurality of images captured under the same conditions.

A processor (e.g., the processor 120 in FIG. 1) may set a specific point of a subject 830 as a reference point 831 (step S810). Any distinguishing point in the subject (e.g., a point having a clear difference in contrast) may be selected as the reference point 831. The processor may control a tilt OIS (e.g., the tilt OIS 310 in FIG. 3A) in real time such that an optical axis 811 of a camera 810 (e.g., the camera 300 in FIG. 3A) passes through the reference point 831 (step S820). For this operation, the processor may receive motion information from a sensor module (e.g., the sensor module 176 in FIG. 1) of an electronic device 820 (e.g., the electronic device 101 in FIG. 1) and control the tilt OIS based on the received motion information.

When a plurality of images are captured in a state where the direction of the optical axis 811 of the camera 810 is always controlled to pass through the reference point 831 by the tilt OIS, the images may be determined as being captured under relatively similar conditions. Then, using a well-known technique such as SfM (Structure from Motion), a 3D image may be generated from the captured images (step S830).

According to certain embodiments of the disclosure, an electronic device may include a camera, a tilt optical image stabilizer (OIS) for rotating the camera about at least one axis with respect to the electronic device, and a processor operatively connected to the camera and the tilt OIS. The processor may be configured to operate the camera and the tilt OIS such that the camera is rotated about the at least one axis and captures an image, and to synthesize a plurality of images captured by the camera.

In addition, the tilt OIS may include a holder installed in the electronic device, a fastener rotatably supporting the camera to the holder, and a driver rotating the camera about the at least one axis with respect to the holder.

In addition, the processor may be configured to receive motion information of the electronic device from a sensor that detects the motion information, and to operate, based on the motion information, the tilt OIS to rotate the camera in a direction compensating for a motion of the electronic device.

In addition, the processor may be configured to receive motion information of the electronic device from a sensor that detects the motion information, and to determine, based on at least one of the motion information and a user input, one of modes of the camera and the tilt OIS.

In addition, the processor may be configured to, when one of the modes is determined, operate the camera and the tilt OIS to obtain a plurality of images which are captured with an optical axis of the camera facing different points, respectively, and to acquire a synthesized image by stitching overlapped portions of the plurality of images.

In addition, the processor may be configured to, when one of the modes is determined, control the camera to capture a reference image, to operate the camera and the tilt OIS to capture at least one auxiliary image in a state where the camera moves in units of sub-pixels constituting a pixel of the camera, and to synthesize the reference image and the at least one auxiliary image into one image.

In addition, the processor may be configured to, when one of the modes is determined, set a reference guideline, and to operate the tilt OIS such that a distance between an optical axis of the camera and the reference guideline is maintained below a given value while the optical axis moves along the reference guideline.

In addition, the processor may be configured to operate the tilt OIS such that the optical axis of the camera moves at a constant speed along the reference guideline.

In addition, the processor may be configured to, when one of the mode modes is determined, set a reference point, and to operate the tilt OIS such that an optical axis of the camera passes through the reference point.

In addition, the processor may be configured to provide a preview image by operating the camera and the tilt OIS in real time.

According to certain embodiments of the disclosure, an operating method of an electronic device that includes a camera and a tilt optical image stabilizer (OIS) for rotating the camera about at least one axis with respect to the electronic device may include operating the camera and the tilt OIS such that the camera is rotated about the at least one axis and captures an image, and synthesizing a plurality of images captured by the camera.

In addition, tilt OIS may include a holder installed in the electronic device, a fastener rotatably supporting the camera to the holder, and a driver rotating the camera about the at least one axis with respect to the holder.

In addition, the method may further include receiving motion information of the electronic device from a sensor that detects the motion information; and operating, based on the motion information, the tilt OIS to rotate the camera in a direction compensating for a motion of the electronic device.

In addition, the method may further include receiving motion information of the electronic device from a sensor that detects the motion information; and determining, based on at least one of the motion information and a user input, one of modes of the camera and the tilt OIS.

In addition, when one of the modes is determined, operating the camera and the tilt OIS may include obtaining a plurality of images which are captured with an optical axis of the camera facing different points, respectively, and synthesizing the plurality of images may include acquiring a synthesized image by stitching overlapped portions of the plurality of images.

In addition, when one of the modes is determined, operating the camera and the tilt OIS may include controlling the camera to capture a reference image, and operating the camera and the tilt OIS to capture at least one auxiliary image in a state where the camera moves in units of sub-pixels constituting a pixel of the camera, and synthesizing the plurality of images may include synthesizing the reference image and the at least one auxiliary image into one image.

In addition, the method may further include, when one of the modes is determined, setting a reference guideline. In this case, operating the camera and the tilt OIS may include operating the tilt OIS such that a distance between an optical axis of the camera and the reference guideline is maintained below a given value while the optical axis moves along the reference guideline.

In addition, operating the camera and the tilt OIS may include operating the tilt OIS such that the optical axis of the camera moves at a constant speed along the reference guideline.

In addition, the method may further include, when one of the modes is determined, setting a reference point. In this case, operating the camera and the tilt OIS may include operating the tilt OIS such that an optical axis of the camera passes through the reference point.

In addition, the method may further include providing a preview image by operating the camera and the tilt OIS in real time.

The embodiments of the disclosure disclosed in this specification and drawings only present a specific example in order to easily describe the technical contents according to an embodiment of the disclosure and to help an understanding of the embodiments of the disclosure, and they do not intend to limit the scope of the embodiments of the disclosure. Accordingly, all changes or modifications derived from the technical idea of certain embodiments of the disclosure in addition to the embodiments described herein should be construed as being included in the scope of certain embodiments of the disclosure without departing from the scope of the disclosure.

What is claimed is:

1. An electronic device comprising:
   a camera; and
   at least one processor operatively connected to the camera,
   wherein the at least one processor is configured to:
   determine an amount of motion and a direction of motion of the electronic device by a sensor;
   when the amount of motion is less than a predetermined amount of motion, rotate the camera about a predetermined axis to obtain a plurality of images in a particular direction;
   when the amount of motion exceeds the predetermined amount of motion, rotate the camera to compensate for the motion and obtain the plurality of images in the particular direction; and
   synthesize the plurality of images or a reference image and at least one auxiliary image.

2. The electronic device of claim 1, further comprising a holder installed in the electronic device, a fastener securing the camera in the holder, and a driver configured to rotate the camera with respect to the holder about at least one axis.

3. The electronic device of claim 1, wherein the at least one processor is configured to:
   when the amount of motion exceeds the predetermined amount of motion and shutter speed exceeds a predetermined shutter speed, capture a reference image, and rotate the camera to obtain at least one auxiliary image in the particular direction that are less than one pixel apart.

4. The electronic device of claim 1 further comprising a tilt optical image stabilizer (OIS), wherein the at least one processor is configured to:
   operate the tilt OIS to obtain the plurality of images with an optical axis of the camera facing different points.

5. The electronic device of claim 1 further comprising a tilt optical image stabilizer (OIS), wherein the at least one processor is configured to:
   when the amount of motion exceeds the predetermined amount of motion and shutter speed exceeds a predetermined shutter speed, operate the tilt OIS to capture the at least one auxiliary image.

6. The electronic device of claim 1 further comprising a tilt optical image stabilizer (OIS), wherein the at least one processor is configured to:
   set a reference point, and
   operate the tilt OIS such that an optical axis of the camera passes through the reference point.

7. The electronic device of claim 1, wherein the at least one processor is configured to:
   provide a preview image in real time.

8. A method of an electronic device including a camera, the method comprising:
   determining an amount of motion and a direction of motion of the electronic device by a sensor;
   when the amount of motion is less than a predetermined amount of motion, rotating the camera about a predetermined axis to obtain a plurality of images in a particular direction;

when the amount of motion exceeds the predetermined amount of motion, rotating the camera to compensate for the motion and obtaining the plurality of images in the particular direction; and synthesizing the plurality of images or a reference image and at least one auxiliary image.

9. The method of claim 8, wherein the electronic device further comprises a holder installed in the electronic device, a fastener securing the camera in the holder, and a driver configured to rotate the camera with respect to the holder, about at least one axis.

10. The method of claim 8, further comprising:
when the amount of motion exceeds the predetermined amount of motion and shutter speed exceeds a predetermined shutter speed, capturing a reference image, and rotating the camera to obtain at least one auxiliary image in the particular direction that are less than one pixel.

11. The method of claim 8 wherein the electronic device comprises a tilt optical image stabilizer (OIS), the method further comprising:
operating the tilt OIS includes obtaining the plurality of images with an optical axis of the camera facing different points.

12. The method of claim 8, wherein the electronic device comprises a tilt optical image stabilizer (OIS), the method further comprising:
when the amount of motion exceeds the predetermined amount of motion and a shutter speed exceeds a predetermined shutter speed, operating tilt OIS to capture the at least one auxiliary image.

13. The method of claim 8, wherein the electronic device further comprises a tilt optical image stabilizer (OIS), the method further comprising:
setting a reference point,
wherein operating the camera and the tilt OIS includes operating the tilt OIS such that an optical axis of the camera passes through the reference point.

14. The method of claim 8, further comprising:
providing a preview image in real time.

\* \* \* \* \*